US011147098B2

(12) United States Patent
Xie et al.

(10) Patent No.: US 11,147,098 B2
(45) Date of Patent: Oct. 12, 2021

(54) ELECTRONIC APPARATUS, WIRELESS COMMUNICATION DEVICE, AND WIRELESS COMMUNICATION METHOD

(71) Applicant: Sony Corporation, Tokyo (JP)

(72) Inventors: Yuxuan Xie, Beijing (CN); Na Li, Beijing (CN); Haowei Wang, Beijing (CN); Tao Cui, Beijing (CN); Huiling Zuo, Beijing (CN); Song Wang, Beijing (CN)

(73) Assignee: SONY CORPORATION, Tokyo (JP)

( * ) Notice: Subject to any disclaimer, the term of this patent is extended or adjusted under 35 U.S.C. 154(b) by 28 days.

(21) Appl. No.: 16/496,964

(22) PCT Filed: Jun. 26, 2018

(86) PCT No.: PCT/CN2018/092811
§ 371 (c)(1),
(2) Date: Sep. 24, 2019

(87) PCT Pub. No.: WO2019/001411
PCT Pub. Date: Jan. 3, 2019

(65) Prior Publication Data
US 2020/0383136 A1     Dec. 3, 2020

(30) Foreign Application Priority Data

Jun. 29, 2017  (CN) .......................... 201710537404.8

(51) Int. Cl.
*H04W 74/00* (2009.01)
*H04B 17/318* (2015.01)
(Continued)

(52) U.S. Cl.
CPC ........ *H04W 74/006* (2013.01); *H04B 17/318* (2015.01); *H04W 16/28* (2013.01);
(Continued)

(58) Field of Classification Search
CPC .............. H04W 74/006; H04W 16/28; H04W 72/0446; H04W 72/046; H04W 74/0808;
(Continued)

(56) References Cited

U.S. PATENT DOCUMENTS

2016/0360553 A1* 12/2016 Cheng ..................... H04W 4/08
2016/0366669 A1* 12/2016 Yum ....................... H04W 4/70
(Continued)

FOREIGN PATENT DOCUMENTS

CN          1591973 A      3/2005
CN        101253783 A      8/2008
(Continued)

OTHER PUBLICATIONS

International Search Report and Written Opinion dated Sep. 12, 2018 for PCT/CN2018/092811 filed on Jun. 26, 2018, 8 pages including English Translation of the International Search Report.

*Primary Examiner* — Ivan O Latorre
(74) *Attorney, Agent, or Firm* — Xsensus, LLP

(57) ABSTRACT

The present disclosure relates to an electronic apparatus, a wireless communication device, and a wireless communication method. According to an embodiment, the electronic device for a base station side comprises a processing circuit. The processing circuit is configured to: perform control to perform, on a beam corresponding to a user equipment, channel detection on a target channel, the channel detection being based on a specific beam direction; and determine the access to the target channel according the channel detection result.

14 Claims, 12 Drawing Sheets

(51) Int. Cl.
*H04W 16/28* (2009.01)
*H04W 72/04* (2009.01)
*H04W 74/08* (2009.01)

(52) U.S. Cl.
CPC ..... *H04W 72/046* (2013.01); *H04W 72/0446* (2013.01); *H04W 74/0808* (2013.01)

(58) Field of Classification Search
CPC ... H04W 24/08; H04W 48/16; H04W 72/085; H04W 16/14; H04W 74/004; H04W 24/10; H04W 4/025; H04B 17/318; H04B 7/06; H04B 7/0617; H04B 17/382
See application file for complete search history.

(56) References Cited

U.S. PATENT DOCUMENTS

| | | | |
|---|---|---|---|
| 2017/0118774 A1* | 4/2017 | Cariou | H04W 74/0816 |
| 2018/0115958 A1* | 4/2018 | Raghavan | H04B 7/0639 |
| 2019/0268939 A1* | 8/2019 | Yang | H04W 72/042 |
| 2019/0373635 A1* | 12/2019 | Yang | H04B 7/0408 |
| 2020/0100221 A1* | 3/2020 | Tang | H04J 11/0076 |

FOREIGN PATENT DOCUMENTS

| | | |
|---|---|---|
| CN | 106537806 A | 3/2017 |
| WO | 2015/195375 A1 | 12/2015 |

* cited by examiner

ELECTRONIC APPARATUS, WIRELESS COMMUNICATION DEVICE, AND WIRELESS COMMUNICATION METHOD

CROSS-REFERENCE TO RELATED APPLICATIONS

The present application is based on PCT filing PCT/CN2018/092811, filed Jun. 26, 2018, which claims priority to CN 201710537404.8, filed Jun. 29, 2017, the entire contents of each are incorporated herein by reference.

FIELD OF THE INVENTION

The present disclosure relates generally to the technical filed of wireless communication, and more particularly, to an electronic device, wireless communication apparatus and wireless communication method for base station side, as well as an electronic device, wireless communication apparatus and wireless communication method for user equipment side.

BACKGROUND OF THE INVENTION

A multi-beam based communication process generally comprises a phase of initial beam alignment between a Transmission Reception Point (TRP) and a User Equipment (UE) (which may also be referred to as a beam determining process) and a beam tracking phase (which may also be referred to as a beam changing process) of tracking a movement and the like of the UE by the TRP. As shown in FIG. 10, due to a movement, rotation, occlusion and the like of the UE, the TRP and the UE can update beams. A beam updating process may be regarded as a beam refining process, which is based on prior knowledge of a beam pair where the TRP and the UE are located.

SUMMARY OF THE INVENTION

A brief summary of the present invention is given below to provide a basic understanding of some aspects of the present invention. It should be understood that the summary is not exhaustive. It does not intend to define a key or important part of the present invention, nor does it intend to limit the scope of the present invention. The object of the summary is only to briefly present some concepts, which serves as a preamble of the detailed description that follows.

According to an embodiment, there is provided an electronic device for base station side comprising a processing circuitry. The processing circuitry is configured to: perform control to carry out a channel detection based on specific beam direction with respect to a target channel on a beam corresponding to a user equipment; and determine an access to the target channel based on a result of the channel detection.

According to another embodiment, there is provided a wireless communication apparatus for base station side comprising a transceiver device and a processing circuitry. The processing circuitry is configured to: control the transceiver device to carry out a channel detection based on specific beam direction with respect to a target channel on a beam corresponding to a user equipment; and determine an access to the target channel based on a result of the channel detection.

According to still another embodiment, there is provided a wireless communication method for base station side, comprising: performing a channel detection based on specific beam direction with respect to a target channel on a beam corresponding to a user equipment; and determining an access to the target channel based on a result of the channel detection.

According to yet another embodiment, there is provided an electronic device for user equipment side comprising a processing circuitry. The processing circuitry is configured to: perform control to carry out a channel detection based on specific beam direction with respect to a target channel on a beam corresponding to a base station; and perform control to access the target channel based on a result of the channel detection or based on an instruction from the base station.

According to another embodiment, there is provided a wireless communication apparatus for user equipment side, comprising a transceiver device and a processing circuitry. The processing circuitry is configured to: control the transceiver device to perform a channel detection based on specific beam direction with respect to a target channel on a beam corresponding to a base station; and control the transceiver device to access the target channel based on a result of the channel detection or based on an instruction from the base station.

According to still another embodiment, there is provided a wireless communication method for user equipment side, comprising: performing a channel detection based on specific beam direction with respect to a target channel on a beam corresponding to a base station; and accessing the target channel based on a result of the channel detection or based on an instruction from the base station.

Embodiments of the present invention are advantageous to increasing an access probability to a target channel by carrying out a channel detection based on specific beam direction with respect to the target channel.

BRIEF DESCRIPTION OF THE DRAWINGS

The present invention could be better understood with reference to the detailed description given below in combination with the appended drawings, wherein throughout the drawings, identical or like reference signs are used to represent identical or like components. The appended drawings together with the detailed description below are included in the specification and form a part of the specification, to further describe preferred embodiments of the present invention and explain the principles and advantages of the present invention by way of examples. In the appended drawings.

EMBODIMENTS OF THE INVENTION

Hereinafter, embodiments of the present invention will be described with reference to the appended drawings. Elements and features described in one figure or embodiment of the present invention may be combined with elements and features described in one or more other figures or embodiments. It should be noted that, for the sake of clarity, representation and description of components and processing known to those ordinarily skilled which are irrelevant to the present invention are omitted in the appended drawings and the description.

Figure 1:
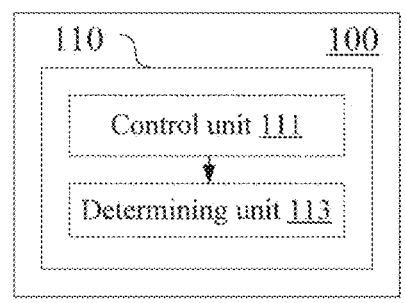
FIG. 1 is a block diagram showing a configuration example of an electronic device for base station side according to an embodiment of the present invention.

As shown in FIG. 1, an electronic device 100 for base station side according to an embodiment of the present invention comprises a processing circuitry 110. The processing circuitry 110 can, for example, be realized as a specific chip, chipset or central processing unit (CPU) or the like.

The processing circuitry 110 comprises a control unit 111 and a determining unit 113. It should be noted that, although the control unit 111 and the determining unit 113 are shown in the form of functional blocks in the figure, it should be understood that the functions of these units can also be realized by the processing unit 110 as a whole, but not necessarily realized by individual actual components in the processing circuitry 110. Further, although the processing circuitry 110 is shown by one frame in the figure, the electronic device 100 can comprise a plurality of processing circuitries, and can distribute the functions of the control unit 111 and the determining unit 113 to the plurality of processing circuitries so as to implement these functions through cooperative operations of the plurality of processing circuitries.

The control unit 111 is configured to perform control to carry out a channel detection based on specific beam direction with respect to a target channel on a beam corresponding to a user equipment.

In a detailed embodiment, the channel detection may, for example, comprise Clear channel assessment (CCA) based on specific beam direction or Received signal strength indicator (RSSI) based on specific beam direction. The CCA based on specific beam direction is generally used for quickly assessing a real-time occupation condition of an unlicensed frequency band in a certain direction. For example, in a scenario where a low latency is required, it is possible to determine an access to the target channel based on a result of the CCA. The RSSI based on specific beam direction is a long-term average measurement on interference, and is a statistic. For example, in a scenario where a latency is tolerated, it is possible to determine an access to the target channel based on a result of the RSSI. However, the channel detection in embodiments of the present invention is not limited to the above-mentioned exemplary manner.

Further, according to an embodiment, the target channel can be located at 60 GHz unlicensed frequency band. The 60 GHz unlicensed frequency band provides larger available continuous bandwidths in different regions of the world, and involves a finite number of Wi-Fi (Wireless Fidelity) deployments. The Wi-Fi standard based on IEEE 802.11ad which is currently used is based on Listen-Before-Talk (LBT) principle. Although the 60 HGz frequency band exhibits a higher propagation path loss, utilization for this frequency band is made very attractive by utilizing a directional communication and benefiting from beamforming gains. Due to smaller wavelengths, it is easier to manufacture small-sized multi-element antenna arrays for beamforming. Also, through the communication based on specific beam direction, higher spatial multiplexing is capable of being obtained so as to improve system throughput and spectrum frequency.

Although the target channel located at 60 GHz unlicensed frequency band has been described as an example, it should be understood that the present invention may also be applied to other frequency bands.

Further, the beam corresponding to a user equipment can be based on a beam configuration for a communication based on specific beam direction between the base station and the user equipment. According to an embodiment, the processing circuitry 110 can be configured to perform control to determine the beam configuration.

For the sake of description, an exemplary process of determining the beam configuration for the communication based on specific beam direction will be described by taking a downlink as an example; however, a similar process may also be applied to an uplink communication based on specific beam direction.

For a downlink, it is necessary to manage base station transmission beams and user equipment reception beams (accordingly, for an uplink, it is necessary to manage base station reception beams and user equipment transmission beams), so as to benefit from transmission/reception gains of the communication based on specific beam direction. Next, an exemplary process included in beam management will be described for the sake of description instead of limitation, and this process can be performed in one or more TRPs.

P-1 Process: it is used for performing UE measurements on different TRP transmission beams so as to support a selection for the TRP transmission beams or UE reception beams. For beamforming at the TRP, this process generally comprises performing intra-TRP or inter-TRP transmission beam scanning from a group of different beams. For beamforming at the UE, this process generally comprises performing reception beam scanning from a group of different beams. The TRP transmission beams and the UE reception beams can be determined together or determined successively.

P-2 Process: it is used for performing UE measurements for different TRP transmission beams so as to make it possible to change inter-TRP or intra-TRP transmission beams. The beams may come from a smaller beam set, so as to perform a beam refinement relative to the P-1 process. The P-2 process may be a special case of the P-1 process.

P-3 Process: it is used for performing UE measurements for a same TRP transmission beam, so as to change the UE reception beams in a case where the UE uses beamforming.

In a case where the beam configuration is known, a specific user equipment corresponds to specific base station transmission beams, such that the base station can carry out a channel detection only on the corresponding beams.

Further, according to an embodiment, in the determined beam configuration, different beams can occupy different resources, so as to make it possible to avoid interference between different beams.

Alternatively, according to another embodiment, in the determined beam configuration, different beams can occupy a same resource. In this case, in order to avoid interference between different beams, the processing circuitry 110 can also be configured to control the base station to perform interference self-cancellation.

Continuing with FIG. 1, the determining unit 113 is configured to determine an access to the target channel based on a result of the channel detection.

For example, in a case where the CCA based on specific beam direction is successful or the RSSI based on specific beam direction is in a normal range (the range can be determined according to specific apparatus specification and application scenario), an access to the target channel is allowed, for example, a data transmission is performed with the user equipment using the target channel.

In the above-mentioned embodiment, it is advantageous to increasing an access probability to the target channel by carrying out a channel detection based on specific beam direction with respect to the target channel.

Further, according to an embodiment, the control unit 111 can also be configured to perform control to instruct the user equipment to carry out a channel detection based on specific beam direction with respect to the target channel, and the determining unit 113 is configured to determine an access to the target channel further based on a result of the channel detection by the user equipment.

As stated previously, the communication based on specific beam direction is capable of obtaining higher spatial multiplexing; however, on the other hand, for an operation on an unlicensed frequency band, interference is no longer omnidirectional, which causes a possibility that transmission beams from a first transmission party are not monitored by a nearby second transmission party, such that a conflict possibly occurs when the second transmission party starts a transmission. Therefore, as compared with a case of using wide transmission/reception beams, a channel assessment and conflict avoidance scheme using narrow transmission beams possibly needs to be improved.

Figure 11:
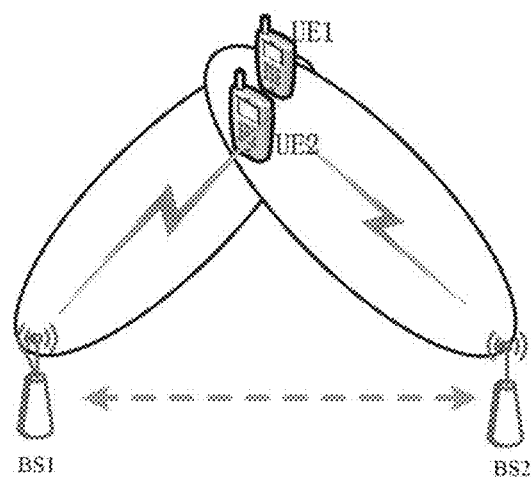
FIG. 11 is a schematic view for explaining interference in the communication based on specific beam direction.

For example, transmission beams for a high frequency scenario are relatively narrow, such that signal energy is concentrated at a target user equipment; however, on the other hand, this possibly results in a hidden node problem. As shown in FIG. 11, base stations BS1 and BS2 perform transmissions or receptions in a directional beam mode; when the BS1 senses that a channel is clear and performs a transmission to UE1, the BS2 possibly cannot detect energy of the BS1, and thus the BS2 possibly transmits a signal to UE2. However, both the UE1 and the UE2 are within coverage of transmission beams of the B1 and the B2, and thus the UE1 and the UE2 possibly cannot receive corresponding transmissions due to inter-RAT interference.

Therefore, it is possibly insufficient to obtain complete channel occupation information through only the channel detection based on specific beam direction which is carried out by the base station, and thus assistance by the RSSI/CCA based on specific beam direction which is performed by the UE is possibly needed. Specifically, the RSSI of the UE is capable of assessing an average occupation condition of an unlicensed frequency band in a certain direction within a period of time, and the CCA carried out by the UE can quickly assess a real-time occupation condition of an unlicensed frequency band in a certain direction.

For example, in a scenario where a latency is ultra-low, by licensing assistance, the base station can trigger the UE to report a result of the CCA based on specific beam direction, without requiring the RSSI to be reported.

On the other hand, in a scenario where a latency is tolerated, by licensing assistance, the base station can trigger the UE to report the RSSI based on specific beam direction. The RSSI may face a direction where the UE receives beams, and thus additionally contains beam information. The base station can pre-judge an interference level around the UE according to the RSSI reported by the UE. If the RSSI is in a normal range, the base station can judge that no interference source exists near the UE; otherwise, the base station can judge that an interference source exists near the UE.

Next, the base station can carry out a channel detection based on specific beam direction. For example, if both the base station CCA and the UE CCA are successful, or if the base station CCA is successful and the UE RSSI is in a normal range, the base station can issue data to the UE by using an unlicensed frequency band.

Figure 16:
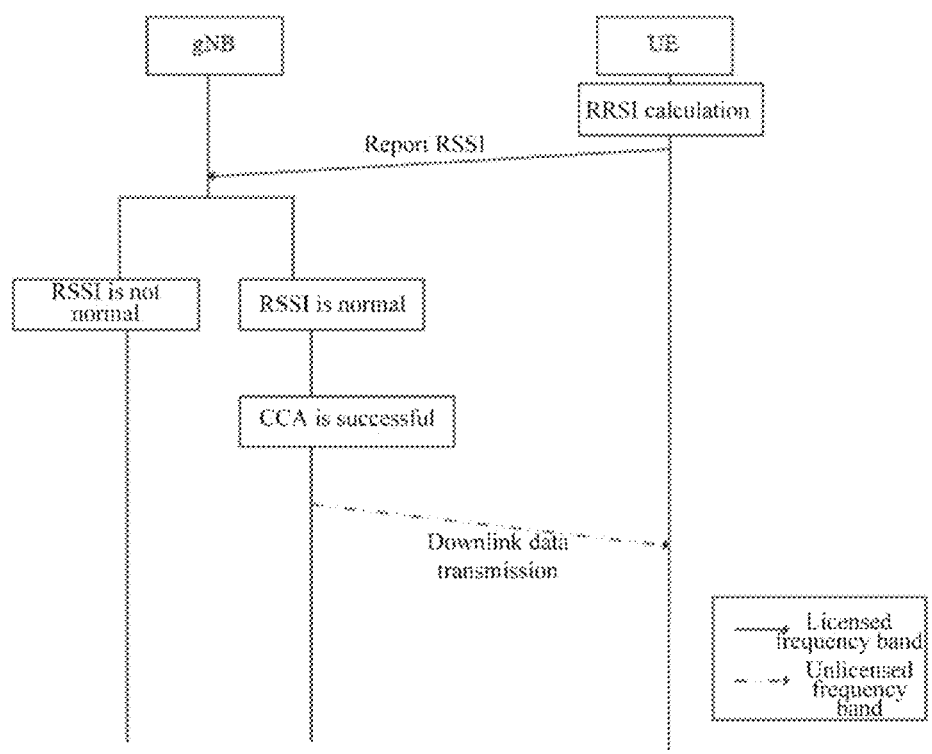
FIG. 16 is a flowchart showing a process example of a channel access in an exemplary embodiment of the present invention.

FIG. 16 shows an exemplary process of a communication performed between the UE and the base station in a scenario where a latency is tolerated. In this scenario, the UE can report RSSI based on specific beam direction, because the RSSI is a long-term average measurement on interference and is a statistic. The base station gNB can acquire more comprehensive information according to the RSSI. If the RSSI is at a normal level, the gNB may not trigger the UE to report CCA based on specific beam direction; if the RSSI is not normal, the gNB cannot acquire an interference condition of the UE in a certain direction, and in this case the gNB can further require the UE to carry out the CCA based on specific beam direction, which CCA can bring more information making a judgment to the gNB, thus facilitating a transmission of data, so as to make it possible to improve transmission efficiency.

In the present embodiment, by further determining an access to the target channel based on a result of the channel detection by the user equipment, it is advantageous to avoiding the above-mentioned hidden node problem.

Further, a user equipment served by the base station possibly moves within coverage of the base station. In a case of performing a communication based on a beam in a specific direction, the user equipment is possibly transferred from one beam into another beam due to a movement, thereby possibly resulting in such a case that: before expiration of a Maximum Channel Occupation Time (MCOT) of a channel previously created by the base station with a certain user equipment, the channel is no longer used since the user equipment has moved out of a corresponding beam. This case is disadvantageous to channel occupation.

According to an embodiment, within a maximum channel occupation time determined with respect to the beam corresponding to the certain user equipment, for another user equipment entering a range of the beam, a communication with said another user equipment is performed using the target channel without performing additional channel detection.

In other words, the base station will not release the channel before the MCOT ends. When one UE leaves a beam where it is located before the MCOT ends, another UE which subsequently enters the beam can inherit the channel in the remaining MCOT, without needing to perform a channel detection. This is advantageous to enhancing occupation for the channel in a case where the UE moves.

Accordingly, according to another embodiment, the control unit 111 can also be configured to perform control to receive information on a real-time position reported by the user equipment.

As an example but not a limitation, manners of acquiring a position by the UE may include a GPS (Satellite Positioning System) positioning manner or base station cooperative positioning manner.

Further, it is also a possible case in which a plurality of user equipments locate within coverage of a same beam of the base station. According to an embodiment, for different user equipments within a same beam range, data transmissions can be performed in a time division multiplexing manner.

Further, for an operation on a target channel on for example 60 GHz unlicensed frequency band, in order to minimize a length of a reservation signal, the base station shall be capable of sending a downlink transmission burst as soon as possible after completing LBT or CCA. Accordingly, according to an embodiment, the base station can control a data transmission with the user equipment on the target channel taking mini-slot as a basic scheduling unit.

However, a blind detection operation at the start of each mini-slot also possibly causes an increase in UE power consumption. Therefore, a time-slot aggregation and dynamic UE monitoring scheme may be adopted.

According to an embodiment, the control unit 113 can be configured to indicate a setting of the mini-slot by Downlink Control Information (DCI) of a Physical Downlink Control Channel (PDCCH).

If the downlink control information indicates that one user equipment is scheduled, then the user equipment performs a data transmission in a predetermined number of following mini-slots; otherwise, the user equipment switches to a standby state until next downlink control information.

Through a dynamic min-slot aggregation and dynamic UE monitoring scheme, the UE power consumption can be saved.

More specifically, it is possible to adopt, for example, the following slot aggregation schemes:

1) a single scheduling licenses to schedule N Transmission Blocks (TBs), each TB being mapped to each slot and being associated with its own Hybrid Automatic Repeat Request (HARQ) process;

2) a single scheduling licenses to schedule a same TB in N slots, the same TB being mapped to each slot in a changing redundancy version, the TB being associated with a single HARQ process;

3) a single scheduling licenses to schedule a single TB, the TB being mapped to N slots and being associated with a single HARQ process.

Next, an example of a communication process based on predetermined beam direction between the base station and the user equipment will be described with reference to FIG. 12 and FIG. 13. It should be understood that, embodiments of the present invention do not necessarily contain various aspects of the above-mentioned embodiment of the present invention like the example that follows, but may contain one aspect or any combination of more aspects in the above-mentioned embodiment.

Figure 12:
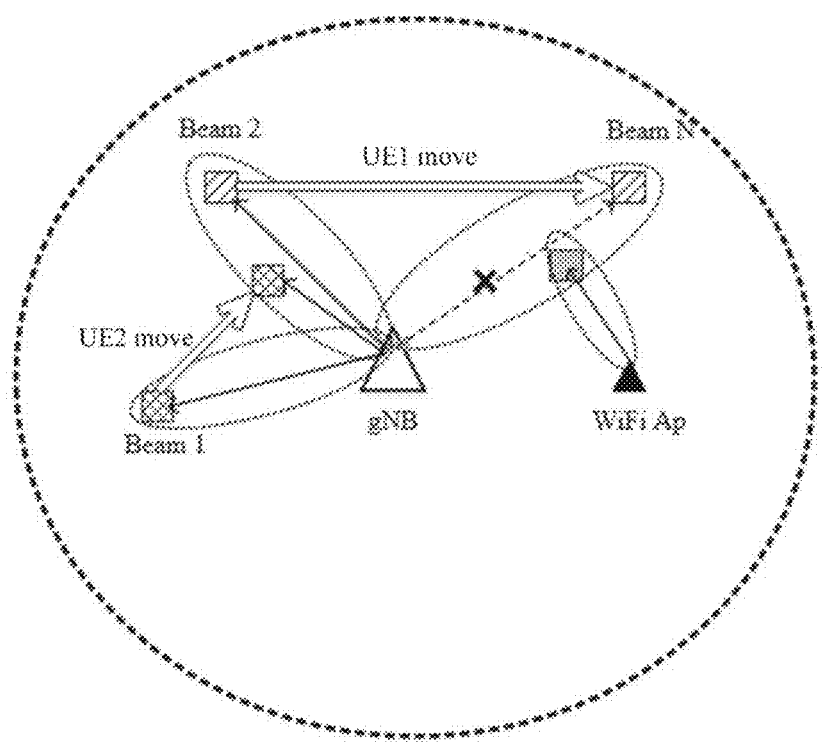
FIG. 12 is a schematic view showing an exemplary application scenario of embodiments of the present invention.

As shown in FIG. 12, at first, the UE1 is located within coverage of a beam 2 of the base station gNB, and joint CCA (the gNB's CCA based on specific beam direction and the UE1's CCA based on specific beam direction) is successful. The gNB reduces a time length of a reservation signal in a mini-slot aggregation manner in the MCOT, so as to make it possible to more quickly issue downlink data to the UE1. In this case, the UE2 is located within coverage of a beam 1, and joint CCA has also been successful.

Figure 13:
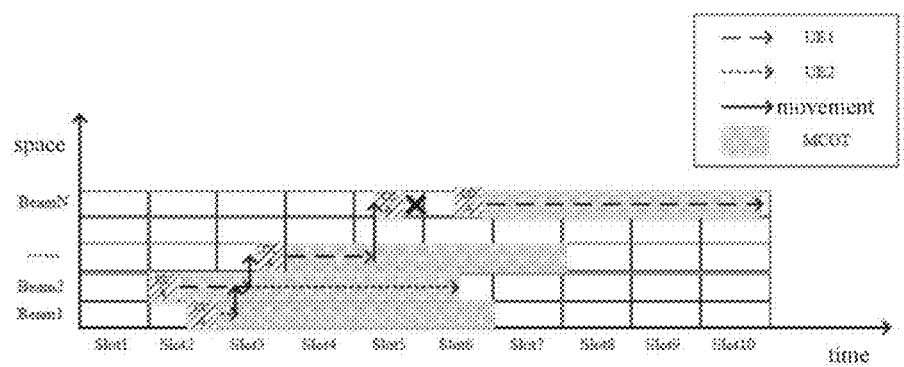
FIG. 13 is a schematic view showing time-space resources of an exemplary communication process of embodiments of the present invention.

After a period of time, for example in a case where the UE2 moves into the coverage of the beam 2 (the solid-line arrow in FIG. 13 represents a movement of the UE), both the UE1 and the UE2 are located in the beam 2, and they can for example share a channel in a time division multiplexing manner.

After a period of time again, for example in a case where the UE1 moves out of the beam 2 whereas the MCOT does not end, the UE2 can continue to occupy this unlicensed channel created by the UE1 and the gNB.

Since the UE1 moves to a region which is not covered by a beam having been created, it is necessary to carry out joint CCA again. If the joint CCA is successful, the UE1 can receive downlink data in a new MCOT. If the joint CCA fails, no data transmission is performed. It should be noted that, although description has been made by taking the joint CCA manner as an example, embodiments of the present invention are not limited to the manner of joint channel detection, but it is possible to determine an access to the target channel based only on a result of the channel detection at base station side or user equipment side.

In addition, as shown in FIG. 13, in the slot 2 (Slot 2), the gNB issues data to the UE1 by the beam 2, and meanwhile the gNB also carries out the CCA by using the beam 1. This case may be divided into the following two subcases.

One subcase is that all beams occupy same frequency resources, and the eNB operates in a full-duplex manner. However, in this subcase, a leakage will occur if a transmission is performed by using the beam 2, and this leakage will enter a receiving circuit of the beam 1. Due to this leakage, receiving power of the beam 1 will possibly become high. In order to avoid the leakage's influences on the CCA, the gNB may be equipped with an interference self-canceller.

The other subcase is that different beams use different frequency resources. Since there are wider frequency band resources available above 60 GHz, different beams use different carrier frequencies. In this way, a mutual-beam interference problem naturally can be avoided.

Figure 14:
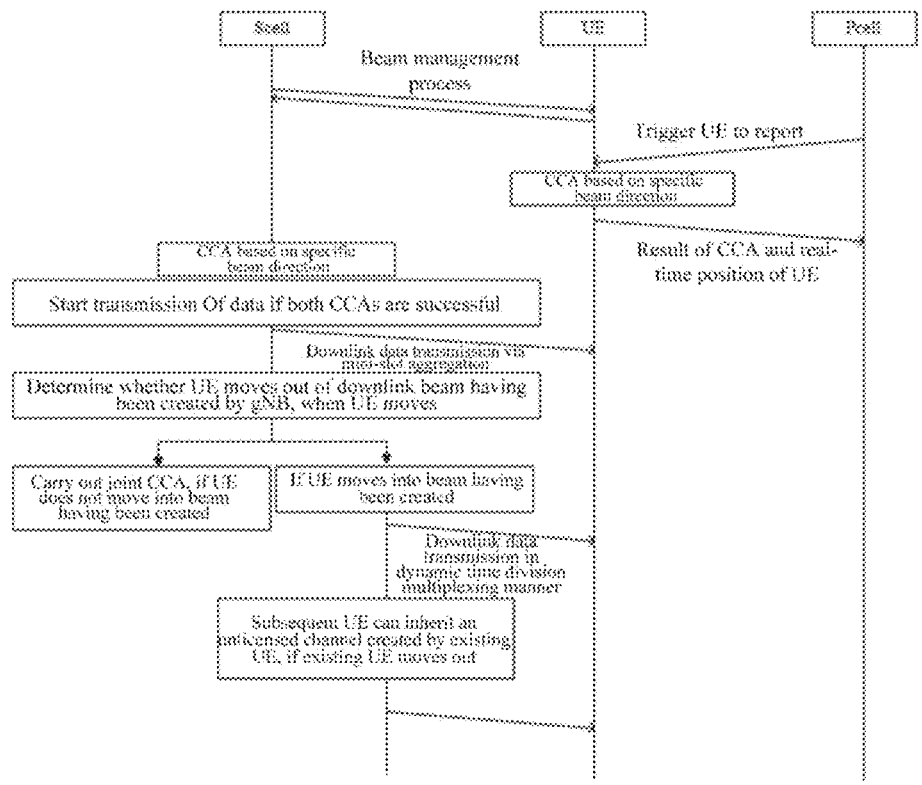
FIG. 14 is a flowchart showing an exemplary communication process of embodiments of the present invention.

Next, an exemplary communication process between the base station and the user equipment, which corresponds to a case where the UE reports a real-time position to the base station, will be described with reference to FIG. 14. As shown by the flowchart of FIG. 14, after receiving the real-time position of the UE, the base station can judge whether the UE is within coverage of an existing downlink beam. If the UE is not within the coverage (e.g., the movement case of the UE1 in FIG. 12), the gNB can trigger the UE to report a result of the CCA based on specific beam direction. If the UE is within the coverage (e.g., the movement case of the UE2 in FIG. 12), the UE can no longer carry out the CCA and the base station can issue data to the UE, that is, the UE1 and the UE2 perform dynamic time division multiplexing in the MCOT. It should be noted that, Pcell and Scell in FIG. 14 are respectively used for representing communications established by the UE with the base station through a licensed frequency band and an unlicensed frequency band, but are not intended to represent that the UE performs communications with two base stations.

Figure 15:
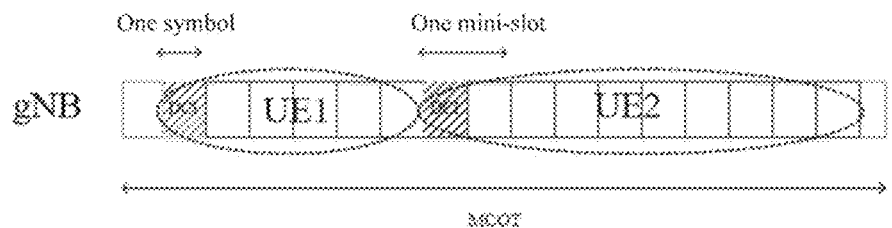
FIG. 15 is a schematic view showing a time division multiplexing manner based on dynamic mini-slot aggregation in an exemplary embodiment of the present invention.

FIG. 15 is a schematic view showing an example of a time division multiplexing manner based on dynamic mini-slot aggregation. When there are a plurality of UEs (e.g., the case where the UE1 and the UE2 are simultaneously located in the beam 2 as shown in FIG. 12 and FIG. 13) within coverage of a beam, due to flexible mini-slot aggregation, these UEs can dynamically monitor a PDCCH, and decode common DCI of the UEs to acquire a number of current mini-slot aggregation, and then can decode DCI specific to the UEs to acquire whether the UEs themselves are scheduled. If one UE is scheduled, the UE will receive downlink data in next several mini-slots. Otherwise, the UE switches to sleep until next DCI.

After the UE1 leaves the beam where it is located before the MCOT ends, the UE2 which subsequently enters the beam can inherit the channel in the remaining MCOT, without needing to carry out CCA again. That is, the gNB will not release the channel before the MCOT ends, thus making it possible to increase a channel occupation ratio to some extent without needing to frequently perform CCA operation. After the MCOT of the UE1 ends, the UE2 necessarily releases the channel to ensure fair sharing of channel resources with other systems.

Figure 2:
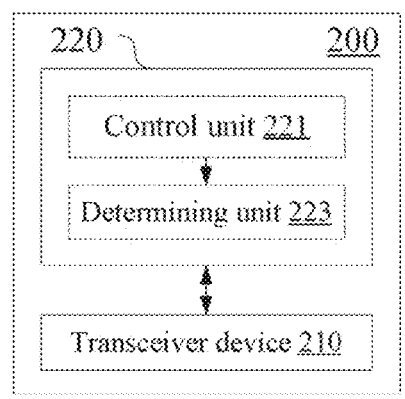
FIG. 2 is a block diagram showing a configuration example of a wireless communication apparatus for base station side according to an embodiment of the present invention.

Next, a configuration example of a wireless communication apparatus for base station side according to an embodiment of the present invention will be described without repeating the details having been described previously. As shown in FIG. 2, the wireless communication apparatus according to the present embodiment comprises a transceiver device 210 and a processing circuitry 220. The processing circuitry comprises a control unit 221 and a determining unit 223.

The control unit 221 is configured to control the transceiver device 210 to carry out a channel detection based on specific beam direction with respect to a target channel on a beam corresponding to a user equipment.

The determining unit 223 is configured to determine an access to the target channel based on a result of the channel detection.

In the foregoing description of the device for base station side according to the embodiment of the present invention, some processes and methods obviously have also been disclosed. Next, explanation of a wireless communication method for base station side according to an embodiment of the present invention will be given without repeating the details having been described previously.

Figure 3:
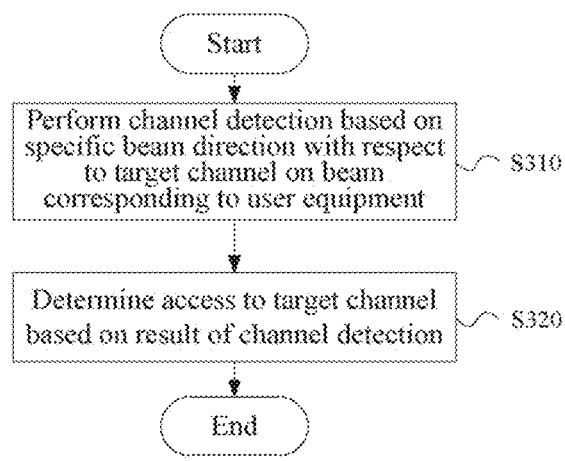
FIG. 3 is a flowchart showing a process example of a wireless communication method for base station side according to an embodiment of the present invention.

As shown in FIG. 3, a wireless communication method for base station side according to an embodiment comprises the following steps:

S310 of performing a channel detection based on specific beam direction with respect to a target channel on a beam corresponding to a user equipment; and S320 of determining an access to the target channel based on a result of the channel detection.

In addition, embodiments of the present invention further include an electronic device for user equipment side.

Figure 4:
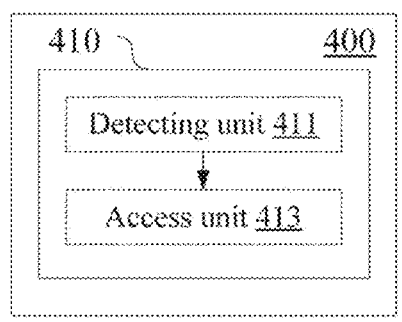
FIG. 4 is a block diagram showing a configuration example of an electronic device for user equipment side according to an embodiment of the present invention.

As shown in FIG. 4, an electronic device 400 for user equipment side according to an embodiment comprises a processing circuitry 410. The processing circuitry 410 comprises a detecting unit 411 and an access unit 413.

The detecting unit 411 is configured to perform control to carry out a channel detection based on specific beam direction with respect to a target channel on a beam corresponding to a base station.

Similarly to the foregoing embodiment, the channel detection may for example comprise CCA based on specific beam direction or RSSI based on specific beam direction. For example, in a scenario where a low latency is required, it is possible to perform an access to the target channel based on a result of the CCA; and in a scenario where a latency is tolerated, it is possible to perform an access to the target channel based on a result of the RSSI.

The access unit 413 is configured to perform control to access the target channel based on a result of the channel detection or based on an instruction from the base station.

In other words, the electronic device for user equipment side according to the present embodiment can autonomously determine an access to the target channel according to a result of the channel detection, or an access to the target channel can be determined by a serving base station of the user equipment. In a case where an access to the target channel is determined by a serving base station, with reference to the foregoing description of the embodiment of the base station side, it is possible to determine an access to the target channel based on a result of the channel detection at base station side or it is possible to determine an access to the target channel based on results of the channel detection at base station side and user equipment side.

For the case of performing a joint channel detection at base station side together with user equipment side, an electronic device at user equipment side according to an embodiment can perform a channel detection based on an instruction from the base station and report a detection result to the base station.

Figure 5:
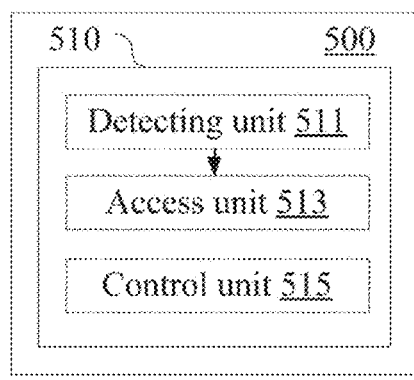
FIG. 5 is a block diagram showing a configuration example of an electronic device for user equipment side according to another embodiment of the present invention.

Accordingly, as shown in FIG. 5, an electronic device 500 for user equipment side according to an embodiment comprises a processing circuitry 510. The processing circuitry 510 comprises a detecting unit 511, an access unit 513 and a control unit 515. Configurations for the detecting unit 511 and the access unit 513 are similar to those for the detecting unit 411 and the access unit 413 described previously.

The control unit 515 is configured to perform control to receive an instruction of performing the channel detection from the base station, and perform control to report a result of the channel detection to the base station.

Further, the channel detection based on specific beam direction may be based on a beam configuration between the base station and the user equipment. Accordingly, with reference to still FIG. 5, according to an embodiment, the control unit 515 can be configured to perform control to determine a beam configuration for a communication based on specific beam direction between the user equipment and the base station. Specifically, it is possible to perform the determination of the beam configuration in a manner similar to that described with respect to the foregoing embodiment of the base station side.

In addition, in view of the case where the user equipment moves between different beams, with reference to still FIG. 5, according to an embodiment, the control unit 515 can be configured to perform control to report information on a real-time position of the user equipment to the base station. Accordingly, for example when one UE leaves a beam where it is located before the MCOT ends, another UE which subsequently enters the beam can inherit the channel in the remaining MCOT, without needing to perform a channel detection.

As stated previously, the base station can control a data transmission with the user equipment on the target channel taking mini-slot as a basic scheduling unit. With reference to still FIG. 5, according to an embodiment, the control unit 515 can be configured to control a data transmission with the base station on the target channel taking mini-slot as a scheduling unit.

More specifically, an indication for a setting of the mini-slot can be received by DCI of a PDCCH. If the DCI indicates that the user equipment is scheduled, then the user equipment performs a data transmission in a predetermined number of following mini-slots; otherwise, the user equipment switches to a standby state until next DCI.

Figure 6:
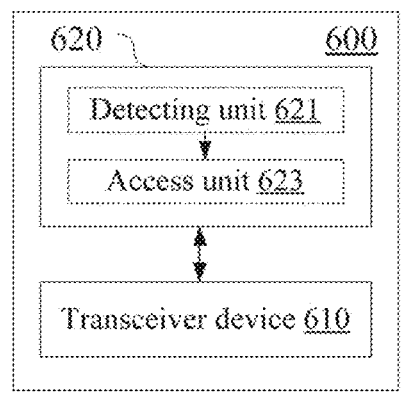
FIG. 6 is a block diagram showing a configuration example of a wireless communication apparatus for user equipment side according to an embodiment of the present invention.

FIG. 6 is a block diagram showing a configuration example of a wireless communication apparatus for user equipment side according to an embodiment. As shown in FIG. 6, a wireless communication apparatus 600 for user equipment side according to the present embodiment comprises a transceiver device 610 and a processing circuitry 620. The processing circuitry 620 comprises a detecting unit 621 and an access unit 623.

The detecting unit 621 is configured to control the transceiver device 610 to carry out a channel detection based on specific beam direction with respect to a target channel on a beam corresponding to a user equipment.

The access unit 623 is configured to control the transceiver device 610 to access the target channel based on a result of the channel detection or based on an instruction from the base station.

Figure 7:
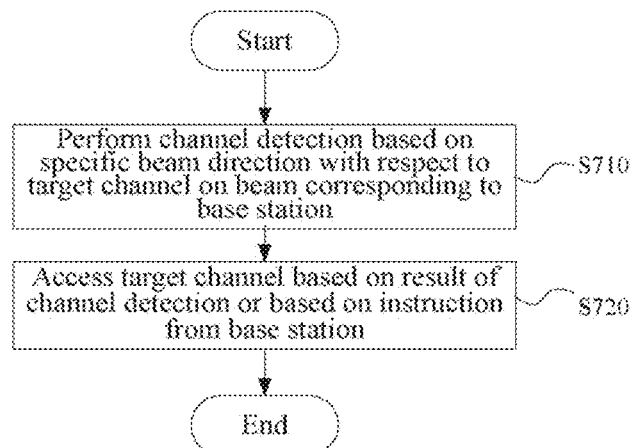
FIG. 7 is a flowchart showing a process example of a wireless communication method for user equipment side according to an embodiment of the present invention.

FIG. 7 shows a wireless communication method for user equipment side according to an embodiment, comprising the following steps:

S710 of performing a channel detection based on specific beam direction with respect to a target channel on a beam corresponding to a base station; and S720 of accessing the target channel based on a result of the channel detection or based on an instruction from the base station.

Figure 8:
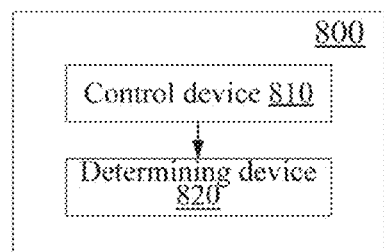
FIG. 8 is a block diagram showing a configuration example of a wireless communication apparatus for base station side according to an embodiment of the present invention.

FIG. 8 is a block diagram showing a configuration example of a wireless communication apparatus for base station side according to an embodiment of the present invention. As shown in FIG. 8, a wireless communication apparatus 800 comprises a control device 810 and a determining device 820. The control device 810 is configured to perform a channel detection based on specific beam direction with respect to a target channel on a beam corresponding to a user equipment. The determining device 820 is configured to determine an access to the target channel based on a result of the channel detection.

Figure 9:
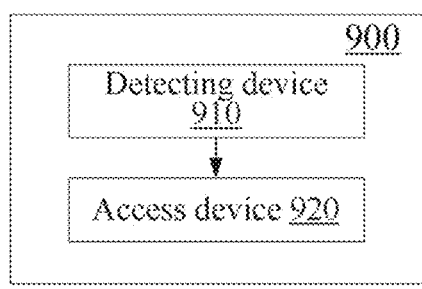
FIG. 9 is a block diagram showing a configuration example of a wireless communication apparatus for user equipment side according to an embodiment of the present invention.

FIG. 9 is a block diagram showing a configuration example of a wireless communication apparatus for user equipment side according to an embodiment of the present invention. As shown in FIG. 9, a wireless communication apparatus 900 comprises a detecting device 910 and an access device 920. The detecting device 910 is configured to carry out a channel detection based on specific beam direction with respect to a target channel on a beam corresponding to a base station. The access device 920 is configured to access the target channel based on a result of the channel detection or based on an instruction from the base station.

Embodiments of the present invention are capable of achieving one or more of the effects of: increasing a channel access probability, fairly sharing an unlicensed frequency band with other systems, increasing a channel occupation ratio, improving a spectrum efficiency and saving UE power consumption.

Figure 17:
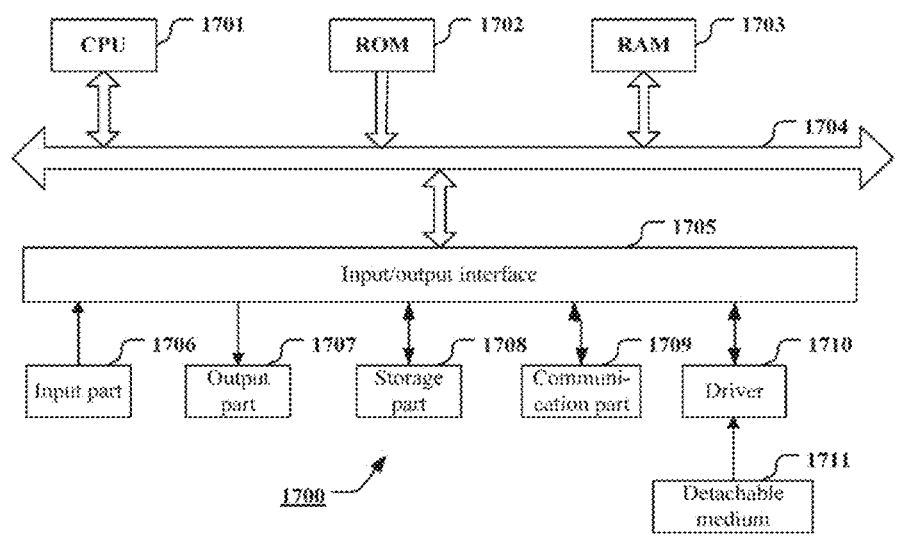
FIG. 17 is a block diagram showing an exemplary structure of a computer that realizes methods and apparatuses of the present disclosure.

As an example, the respective steps of the above method and the respective constituent modules and/or units of the above devices may be implemented as software, firmware or a combination thereof. In the case of implementation by software or firmware, a program constituting the software for implementing the above methods is installed from a storage medium or a network to a computer having a purpose-specific hardware structure (e.g., the universal personal computer 1700 as shown in FIG. 17). The computer, when installed with various programs, is capable of executing various functions and the like.

In FIG. 17, a Central Processing Unit (i.e., CPU) 1701 executes various processing according to a program stored in a Read-Only Memory (ROM) 1702 or a program uploaded from a storage part 1708 to a Random Access Memory (RAM) 1703. In the RAM 1703, data needed when the CPU 1701 executes various processing and the like is also stored as needed. The CPU 1701, the ROM 1702 and the RAM 1703 are linked to each other via a bus 1704. An input/output interface 1705 is also linked to the bus 1704.

The following components are linked to the input/output interface 1705: an input part 1706 (including a keyboard, a mouse and the like), an output part 1707 (including a display, such as a Cathode Ray Tube (CRT), a Liquid Crystal Display (LCD) and the like, as well as a speaker and the like), the storage part 1708 (including a hard disc and the like), and a communication part 1709 (including a network interface card such as an LAN card, a modem and the like). The communication part 1709 executes communication processing via a network such as the Internet. As needed, a driver 1710 may also be linked to the input/output interface 1705. A detachable medium 1711 such as a magnetic disc, an optical disc, a magnetic optical disc, a semiconductor memory and the like is installed on the driver 1710 as needed, such that a computer program read therefrom is installed in the storage part 1708 as needed.

In a case where the above series of processing is implemented by software, a program constituting the software is installed from a network such as the Internet or a storage medium such as the detachable medium 1711.

Those skilled in the art should appreciate that such a storage medium is not limited to the detachable medium 1711 having stored therein a program and distributed separately from an apparatus to provide the program to a user as shown in FIG. 17. Examples of the detachable medium 1711 include a magnetic disc (including a floppy disc (registered trademark)), a compact disc (including a Compact Disc Read-Only Memory (CD-ROM) and a Digital Versatile Disc (DVD), a magneto optical disc (including a Mini Disc (MD) (registered trademark)), and a semiconductor memory. Alternatively, the storage medium may be hard discs and the like included in the ROM 1702 and the storage part 1708, in which programs are stored, and which are distributed concurrently with the apparatus including them to users.

Embodiments of the present invention further relate to a program product having stored therein machine readable instruction codes that, when read and executed by a machine, can execute the above methods according to the embodiments of the present invention.

Accordingly, a storage medium for carrying the above program product having stored therein machine readable instruction codes is also included in the disclosure of the present invention. The storage medium includes but is not limited to a floppy disc, an optical disc, a magnetic optical disc, a memory card, a memory stick and the like.

Embodiments of the present invention further relate to an electronic apparatus. The electronic apparatus, when used for base station side, may be realized as any type of Evolved node B (eNB), such as macro eNB and small eNB. The small eNB may be an eNB of a cell with smaller coverage than a macro cell, such as a pico eNB, a micro eNB and a home (femto) eNB. Alternatively, the electronic apparatus may be realized as any other type of base station, such as NodeB and Base Transceiver Station (BTS). The electronic apparatus may comprise: a main body (also referred to as a base station equipment) configured to control wireless communication; and one or more Remote Radio Heads (RRHs) arranged at different places of the main body. In addition, all the various types of terminals which will be described below can operate as base stations by temporarily or semi-persistently executing base station functions.

The electronic apparatus, when used for user equipment side, may be realized as a mobile terminal (such as an intelligent telephone, a tablet Personal Computer (PC), a notebook PC, a portable game terminal, a portable/softdog mobile router and a digital image pick-up device) or an in-vehicle terminal (such as an automobile navigation equipment). In addition, the electronic apparatus may be a wireless communication module (such as an integrated circuit module including a single or more wafers) installed on each of the above terminals.

[Application Example with Regard to Terminal Equipment]

Figure 18:
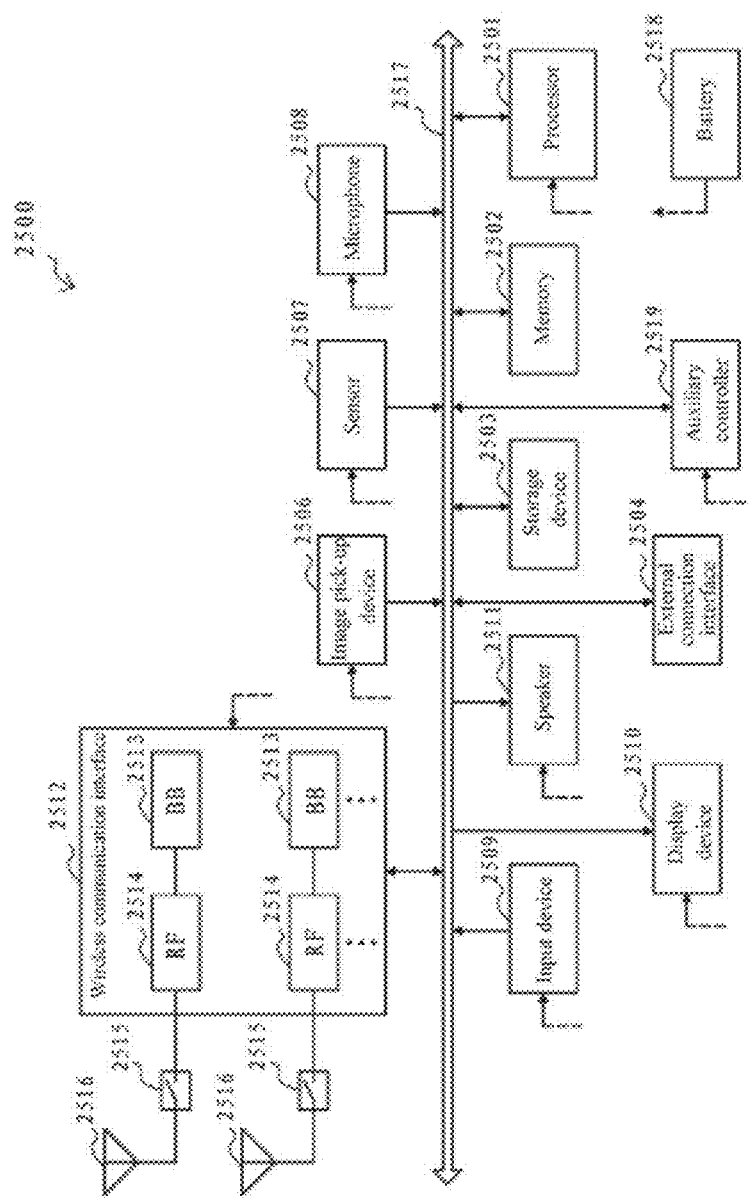
FIG. 18 is a block diagram showing an example of a schematic configuration of an intelligent telephone to which the technology of the present disclosure may be applied.

FIG. 18 is a block diagram showing an example of a schematic configuration of an intelligent telephone 2500 to which the technology of the present disclosure may be applied. The intelligent telephone 2500 comprises a processor 2501, a memory 2502, a storage device 2503, an external connection interface 2504, an image pick-up device 2506, a sensor 2507, a microphone 2508, an input device 2509, a display device 2510, a speaker 2511, a wireless communication interface 2512, one or more antenna switches 2515, one or more antennas 2516, a bus 2517, a battery 2518, and an auxiliary controller 2519.

The processor 2501 may be for example a CPU or a System on Chip (SoC), and control functions of an application layer and additional layers of the intelligent telephone 2500. The memory 2502 comprises an RAM and an ROM, and stores data and programs executed by the processor 2501. The storage device 2503 may comprise a storage medium, such as a semiconductor memory and a hard disc. The external connection interface 2504 is used for connecting an external device (such as a memory card and a Universal Serial Bus (USB) device) to an interface of the intelligent telephone 2500.

The image pick-up device 2506 comprises an image sensor (such as a Charge Coupled Device (CCD) and a Complementary Metal Oxide Semiconductor (CMOS)), and generates a captured image. The sensor 2507 may comprise a group of sensors, such as a measurement sensor, a gyro sensor, a geomagnetic sensor and an acceleration sensor. The microphone 2508 converts sound inputted to the intelligent telephone 2500 to an audio signal. The input device 2509 comprises for example a touch sensor configured to detect a touch on a screen of the display device 2510, a keypad, a keyboard, buttons or switches, and receives an operation or information inputted from a user. The display device 2510 comprises a screen (such as a Liquid Crystal Display (LCD) and an Organic Light-Emitting Diode (OLED) display), and displays an output image of the intelligent telephone 2500. The speaker 2511 converts the audio signal outputted from the intelligent telephone 2500 to sound.

The wireless communication interface 2512 supports any cellular communication scheme (such as LTE and LTE-Advanced), and executes wireless communication. The wireless communication interface 2512 generally may comprise for example a Baseband (BB) processor 2513 and a Radio frequency (RF) circuit 2514. The BB processor 2513 may execute for example coding/decoding, modulation/demodulation and multiplexing/demultiplexing, and execute various types of signal processing for wireless communication. Meanwhile, the RF circuit 2514 may comprise for example a frequency mixer, a filter and an amplifier, and transmit and receive a wireless signal via the antenna 2516. The wireless communication interface 2512 may be a chip module on which a BB processor 2513 and an RF circuit 2514 are integrated. As shown in FIG. 18, the wireless communication interface 2512 may comprise a plurality of BB processors 2513 and a plurality of RF circuits 2514. Although FIG. 18 shows an example in which the wireless communication interface 2512 comprises a plurality of BB processors 2513 and a plurality of RF circuits 2514, the wireless communication interface 2512 may also comprise a single BB processor 2513 or a single RF circuit 2514.

In addition, besides the cellular communication schemes, the wireless communication interface 2512 may support other types of wireless communication schemes, such as a short range wireless communication scheme, a near field communication scheme and a wireless Local Area Network (LAN) scheme. In this case, the wireless communication interface 2512 may comprise a BB processor 2513 and an RF circuit 2514 for each wireless communication scheme.

Each of the antenna switches 2515 switches a connection destination of the antenna 2516 between a plurality of circuits included in the wireless communication interface 2512 (for example, circuits for different wireless communication schemes).

Each of the antennas 2516 comprises a single or more antenna elements (such as a plurality of antenna elements included in an MIMO antenna), and is used for the communication interface 2512 to transmit and receive a wireless signal. As shown in FIG. 18, the intelligent telephone 2500 may comprise a plurality of antennas 2516. Although FIG. 21 shows an example in which the intelligent telephone 2500 comprises a plurality of antennas 2516, the intelligent telephone 2500 may also comprise a single antenna 2516.

In addition, the intelligent telephone 2500 may comprise an antenna 2516 for each wireless communication scheme. In this case, the antenna switch 2515 may be omitted from the configuration of the intelligent telephone 2500.

Figure 10:
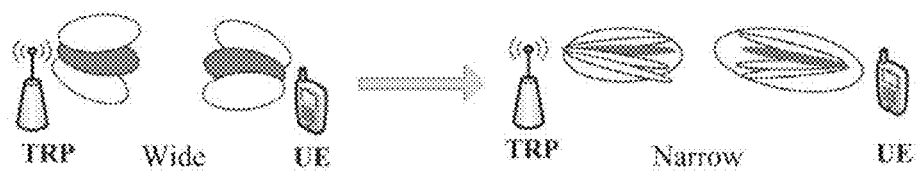
FIG. 10 is a schematic view for explaining a communication based on specific beam direction.

The bus 2517 connects the processor 2501, the memory 2502, the storage device 2503, the external connection interface 2504, the image pick-up device 2506, the sensor 2507, the microphone 2508, the input device 2509, the display device 2510, the speaker 2511, the wireless communication interface 2512 and the auxiliary controller 2519 to each other. The battery 2518 supplies electric power to the respective blocks of the intelligent telephone 2500 as shown in FIG. 10 via feeder lines which are partially shown as dashed lines in the figure. The auxiliary controller 2519 for example manipulates the least necessary function of the intelligent telephone 2500 in a sleep mode.

In the intelligent telephone 2500 as shown in FIG. 18, the transceiver device of the wireless communication apparatus at user equipment side according to the embodiment of the present invention may be realized by the wireless communication interface 2512. At least part of the functions of the processing circuitry and/or respective units of the electronic device or wireless communication apparatus at user equipment side according to the embodiment of the present invention may also be implemented by the processor 2501 or the auxiliary controller 2519. For example, part of the function of the processor 2501 may be implemented by the auxiliary controller 2519 so as to reduce power consumption of the battery 2518. Further, the processor 2501 or the auxiliary controller 2519 may implement part of the functions of the processing circuitry and/or respective units of the electronic device or wireless communication apparatus at user equipment side according to the embodiment of the present invention by executing the program stored in the memory 2501 or the storage device 2503.

[Application Example with Regard to Base Station]

Figure 19:
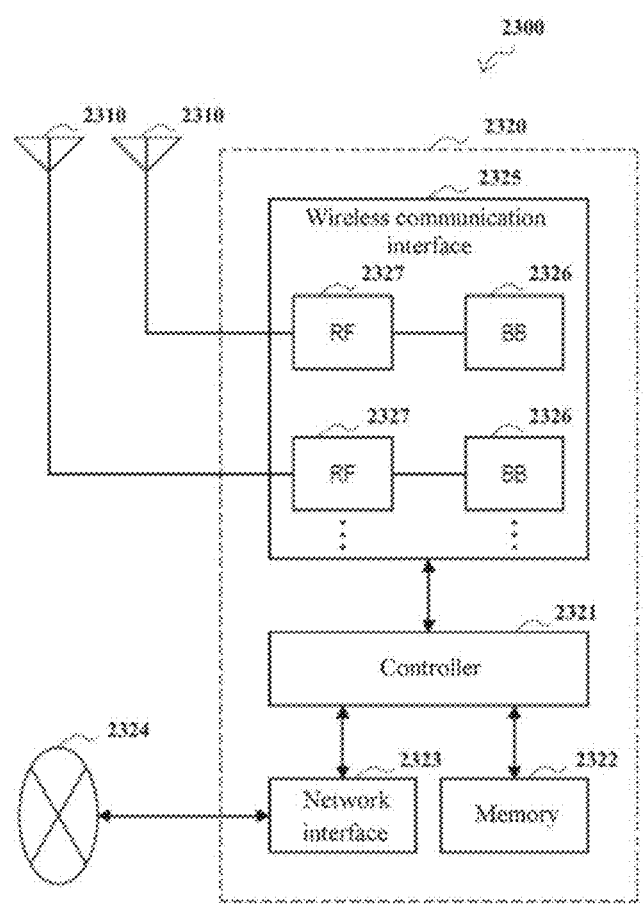
FIG. 19 is a block diagram showing an example of a schematic configuration of an eNB (Evolved Base Station) to which the technology of the present disclosure may be applied.

FIG. 19 is a block diagram showing an example of a schematic configuration of an eNB to which the technology of the present disclosure may be applied. The eNB 2300 comprises one or more antennas 2310 and a base station equipment 2320. The base station equipment 2320 and each antenna 2310 may be connected with each other via a radio frequency (RF) cable.

Each of the antennas 2310 comprises a single or more antenna elements (such as a plurality of antenna elements included in an MIMO antenna), and is used for the base station equipment 2320 to transmit and receive a wireless signal. As shown in FIG. 19, the eNB 2300 may comprise a plurality of antennas 2310. For example, the plurality of antennas 2310 may be compatible with a plurality of frequency bands used by the eNB 2300. Although FIG. 19 shows an example in which the eNB 2300 comprises a plurality of antennas 2310, the eNB 2300 may also comprise a single antenna 2310.

The base station equipment 2320 may comprise a controller 2321, a memory 2322, a network interface 2323, and a wireless communication interface 2325.

The controller 2321 may be for example a CPU or a DSP, and manipulate various functions of a higher layer of the base station equipment 2320. For example, the controller 2321 generates data packets according to data in a signal processed by the wireless communication interface 2325, and transfers the generated packets via the network interface 2323. The controller 2321 may perform binding for data from a plurality of baseband processors to generate bound packets, and transfer the generated bound packets. The controller 2321 may have a logic function of executing control, which is such as radio resource control, radio bearer control, mobility management, admission rule and dispatching. The control may be executed in combination with a nearby eNB or a core network node. The memory 2322 comprises an RAM and an ROM, and stores programs executed by the controller 2321 and various types of control data (such as a terminal list, transmission power data, and scheduling data).

The network interface 2323 is a communication interface for connecting the base station equipment 2320 to a core network 2324. The controller 2321 may communicate with a core network node or another eNB via the network interface 2323. In this case, the eNB 2300 and the core network node or another eNB may be connected to each other via a logic interface (such as S1 interface and X2 interface). The network interface 2323 may also be a wired communication interface, or a wireless communication interface for a wireless backhaul. If the network interface 2323 is a wired communication interface, as compared with frequency bands used by the wireless communication interface 2325, the network interface 2323 may use higher frequency bands for wireless communication.

The wireless communication interface 2325 supports any cellular communication scheme (such as Long Term Evolution (LTE) and LTE-Advanced), and is provided with a wireless connection to a terminal located in a cell of the eNB 2300 via the antenna 2310. The wireless communication interface 2325 generally may comprise for example a BaseBand (BB) processor 2326 and an RF circuit 2327. The BB processor 2326 may execute for example coding/decoding, modulation/demodulation and multiplexing/demultiplexing, and execute various types of signal processing of layers (for example L1, Medium Access control (MAC), Radio Link Control (RLC) and Packet Data Convergence Protocol (PDCP)). Instead of the controller 2321, the BB processor 2326 may have part of all of the above logic function. The BB processor 2326 may be a memory which stores a communication control program, or a module comprising a processor configured to execute a program and a related circuit. The function of the BB processor 2326 may be changed through program updating. The module may be a card or blade inserted in a slot of the base station equipment 2320. Alternatively, the module may also be a chip installed on a card or blade. Meanwhile, the RF circuit 2327 may comprise for example a frequency mixer, a filter and an amplifier, and transmit and receive a wireless signal via the antenna 2310.

As shown in FIG. 19, the wireless communication interface 2325 may comprise a plurality of BB processors 2326. For example, the plurality of BB processors 2326 may be compatible with a plurality of frequency bands used by the eNB 2300. As shown in FIG. 19, the wireless communication interface 2325 may comprise a plurality of RF circuits 2327. For example, the plurality of RF circuits 2327 may be compatible with a plurality of antenna elements. Although FIG. 19 shows an example in which the wireless communication interface 2325 comprises a plurality of BB processors 2326 and a plurality of RF circuits 2327, the wireless communication interface 2325 may also comprise a single BB processor 2326 or a single RF circuit 2327.

In the eNB 2300 as shown in FIG. 19, the transceiver device of the wireless communication apparatus at base station side according to the embodiment of the present invention may be realized by the wireless communication interface 2325. At least part of the functions of the processing circuitry and/or respective units of the electronic device or wireless communication apparatus at base station side according to the embodiment of the present invention may also be implemented by the controller 2321. For example, the controller 2321 may implement at least part of the functions of the processing circuitry and/or respective units of the electronic device or wireless communication apparatus at base station side according to the embodiment of the present invention by executing a program stored in the memory 2322.

[Application Example with Regard to Automobile Navigation Equipment]

Figure 20:
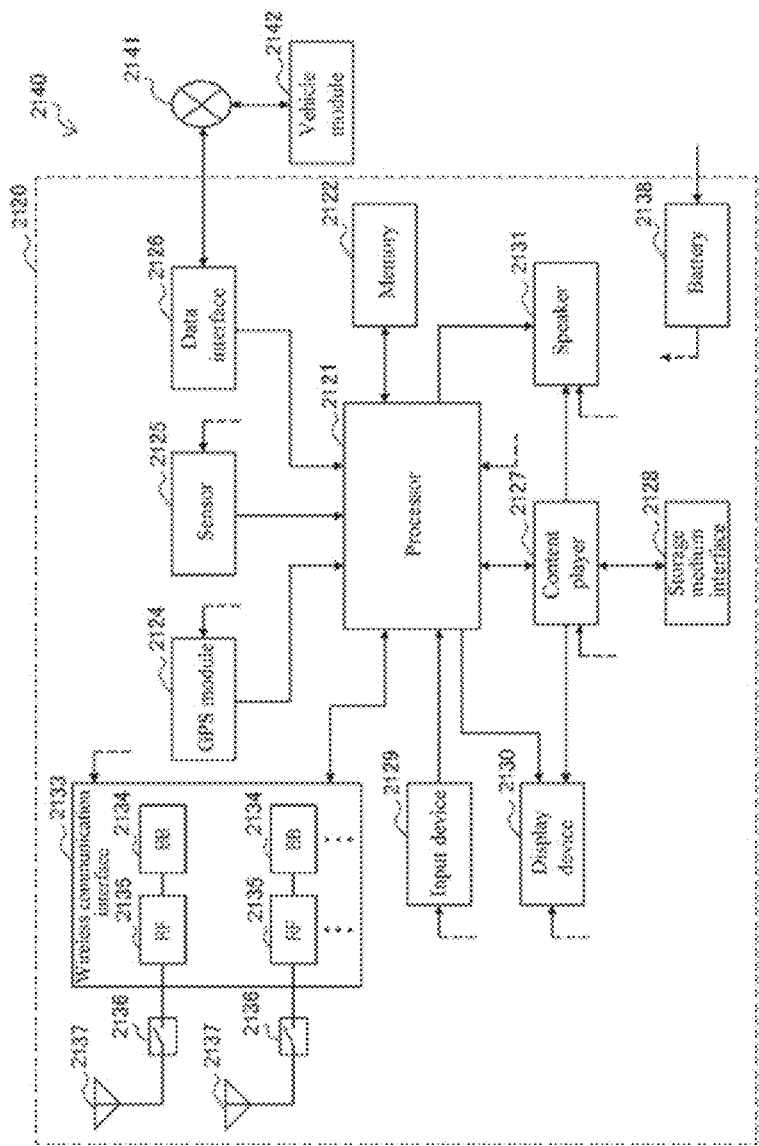
FIG. 20 is a block diagram showing an example of a schematic configuration of an automobile navigation equipment to which the technology of the present disclosure may be applied.

FIG. 20 is a block diagram showing an example of a schematic configuration of an automobile navigation equipment 2120 to which the technology according to the disclosure may be applied. The automobile navigation equipment 2120 comprises a processor 2121, a memory 2122, a Global Positioning system (GPS) module 2124, a sensor 2125, a data interference 2126, a content player 2127, a storage medium interface 2128, an input device 2129, a display device 2130, a speaker 2131, a wireless communication interface 2133, one or more antenna switches 2136, one or more antennas 2137, and a battery 2138.

The processor 2121 may be for example a CPU or a SoC, and controls a navigation function and additional functions of the automobile navigation equipment 2120. The memory 2122 comprises an RAM and an ROM, and stores data and programs executed by the processor 2121.

The GPS module 2124 measures a position (such as a longitude, a latitude and a height) of the automobile navigation equipment 2120 by using a GPS signal received from a GPS satellite. The sensor 2125 may comprise a group of sensors, such as a gyro sensor, a geomagnetic sensor and an air pressure sensor. The data interface 2126 is connected to for example an in-vehicle network 2141 via a terminal which is not shown, and acquires data (such as vehicle speed data) generated by a vehicle.

The content player 2127 reproduces content stored in a storage medium (such as a CD and a DCD). The storage medium is inserted in the storage medium interface 2128. The input device 2129 comprises for example a touch sensor configured to detect a touch on a screen of the display device 2130, buttons or switches, and receives an operation or information inputted from a user. The display device 2130 comprises a screen such as an LCD or an OLED display, and displays an image of the navigation function or the reproduced content. The speaker 2131 outputs sound of the navigation function or the reproduced content.

The wireless communication interface 2133 supports any cellular communication scheme (such as LTE and LTE-Advanced), and executes wireless communication. The wireless communication interface 2133 generally may comprise for example a BB processor 2134 and an RF circuit 2135. The BB processor 2134 may execute for example coding/decoding, modulation/demodulation and multiplexing/demultiplexing, and execute various types of signal processing for wireless communication. Meanwhile, the RF circuit 2135 may comprise for example a frequency mixer, a filter and an amplifier, and transmit and receive a wireless signal via the antenna 2137. The wireless communication interface 2133 may also be a chip module on which a BB processor 2134 and an RF circuit 2135 are integrated. As shown in FIG. 20, the wireless communication interface 2133 may comprise a plurality of BB processors 2134 and a plurality of RF circuits 2135. Although FIG. 20 shows an example in which the wireless communication interface 2133 comprises a plurality of BB processors 2134 and a plurality of RF circuits 2135, the wireless communication interface 2133 may also comprise a single BB processor 2134 or a single RF circuit 2135.

In addition, besides the cellular communication schemes, the wireless communication interface 2133 may support other types of wireless communication schemes, such as a short range wireless communication scheme, a near field communication scheme and a wireless LAN scheme. In this case, for each wireless communication scheme, the wireless communication interface 2133 may comprise a BB processor 2134 and an RF circuit 2235.

Each of the antenna switches 2136 switches a connection destination of the antenna 2137 between a plurality of circuits included in the wireless communication interface 2133 (for example, circuits for different wireless communication schemes).

Each of the antennas 2137 comprises a single or more antenna elements (such as a plurality of antenna elements included in an MIMO antenna), and is used for the communication interface 2133 to transmit and receive a wireless signal. As shown in FIG. 20, the automobile navigation equipment 2120 may comprise a plurality of antennas 2137. Although FIG. 21 shows an example in which the automobile navigation equipment 2120 comprises a plurality of antennas 2137, the automobile navigation equipment 2120 may also comprise a single antenna 2137.

In addition, the automobile navigation equipment 2120 may comprise an antenna 2137 for each wireless communication scheme. In this case, the antenna switch 2136 may be omitted from the configuration of the automobile navigation equipment 2120.

The battery 2138 supplies electric power to the respective blocks of the automobile navigation equipment 2120 as shown in FIG. 20 via feeder lines which are partially shown as dashed lines in the figure. The battery 2138 accumulates the electric power supplied from the vehicle.

In the automobile navigation equipment 2120 as shown in FIG. 20, the transceiver device of the wireless communication apparatus at user equipment side according to the embodiment of the present invention may be realized by the wireless communication interface 2133. At least part of the functions of processing circuitry and/or respective units of the electronic device or wireless communication apparatus at user equipment side according to the embodiment of the present invention may also be implemented by the processor 2121.

The technology of the disclosure may also be realized as an in-vehicle system (or vehicle) 2140 comprising one or more of the following blocks: the automobile navigation equipment 2120, the in-vehicle network 2141 and a vehicle module 2142. The vehicle module 2142 generates vehicle data (such as vehicle speed, engine speed and fault information), and outputs the generated data to the in-vehicle network 2141.

In the foregoing description of the detailed embodiments of the present invention, features described and/or shown with respect to one embodiment may be used in one or more other embodiments in an identical or similar manner, be combined with features in other embodiments, or substitute features in other embodiments.

It should be emphasized that, the term "comprise/include" used herein refers to existence of features, elements, steps or assemblies, but does not preclude existence or addition of one or more other features, elements, steps or assemblies.

In the above embodiments and examples, reference numerals composed of digits are used to represent the respective steps and/or units. Those ordinarily skilled in the art should understand that, these reference numerals aim only to facilitate description and plotting, but do not represent an order thereof or any other limitation.

Further, the methods of the present invention are not limited to be executed in the temporal order described in the specification, but may also be executed sequentially, in parallel or independently in other orders. Therefore, the execution order of the methods described in the present specification does not constitute a limitation to the technical scope of the present invention.

Whilst the present invention has been disclosed above by the description of the detailed embodiments of the present invention, it should be understood that all the above embodiments and examples are exemplary but not limitative. Those skilled in the art could design various modifications, improvements or equivalents with regard to the present invention within the spirit and scope of the appended claims. These modifications, improvements or equivalents should also be construed as being included within the scope of protection of the present invention.

The invention claimed is:

1. An electronic device for base station side, comprising:
a processing circuitry configured to:
perform control to carry out a channel detection based on specific beam direction with respect to a target channel on a beam corresponding to a first user equipment;
determine an access to the target channel based on a result of the channel detection;
when the first user equipment exits a range of the beam and a second user equipment enters a range of the beam during a maximum channel occupation time determined with respect to the beam, perform a communication with the second user equipment using the target channel without either the electronic device or the second user equipment performing additional channel detection;
control a data transmission with the first user equipment on the target channel taking mini-slot as a scheduling unit; and
indicate a setting of the mini-slot by downlink control information of a physical downlink control channel,
wherein when the downlink control information indicates that one user equipment is scheduled, then the first user equipment performs a data transmission in a predetermined number of following mini-slots, and
wherein, otherwise, the first user equipment switches to a standby state until next downlink control information.

2. The electronic device according to claim 1, the processing circuitry is further configured to perform control to instruct the first user equipment to carry out a channel detection based on specific beam direction with respect to the target channel, and
the determination is further based on a result of the channel detection by the user equipment.

3. The electronic device according to claim 1, the processing circuitry is further configured to:
determine a beam configuration for a communication based on specific beam direction between the base station and the first user equipment.

4. The electronic device according to claim 1, the processing circuitry is further configured to perform control to receive information on a real-time position reported by the first user equipment.

5. The electronic device according to claim 1, wherein the processing circuitry is configured to:
for different user equipments within a same beam range, perform data transmissions in a time division multiplexing manner.

6. The electronic device according to claim 1, wherein the channel detection comprises a clear channel assessment based on specific beam direction or a received signal strength indicator based on specific beam direction.

7. The electronic device according to claim 3, wherein in the beam configuration, different beams occupy a same resource, and the processing circuitry is further configured to control the base station to perform interference self-cancellation; or
in the beam configuration, different beams occupy different resources.

8. A wireless communication apparatus for base station side, comprising:
a transceiver device; and
a processing circuitry configured to:
control the transceiver device to carry out a channel detection based on specific beam direction with respect to a target channel on a beam corresponding to a first user equipment;
determine an access to the target channel based on a result of the channel detection;
when the first user equipment exits a range of the beam and a second user equipment enters a range of the beam during a maximum channel occupation time determined with respect to the beam, perform a communication with the second user equipment using the target channel without either the electronic device or the second user equipment performing additional channel detection;
controlling a data transmission with the first user equipment on the target channel taking mini-slot as a scheduling unit; and
indicating a setting of the mini-slot by downlink control information of a physical downlink control channel,
wherein when the downlink control information indicates that one user equipment is scheduled, then the first user equipment performs a data transmission in a predetermined number of following mini-slots, and
wherein, otherwise, the first user equipment switches to a standby state until next downlink control information.

9. An electronic device for user equipment side, comprising:
a processing circuitry configured to:
perform control to carry out a channel detection based on specific beam direction with respect to a target channel on a beam corresponding to a base station;
perform control to access the target channel based on a result of the channel detection or based on an instruction from the base station;
when the electronic equipment exits a range of the beam and a different electronic device enters a range of the beam during a maximum channel occupation time determined with respect to the beam, perform control for the base station to communicate with the different electronic device using the target channel without either the base station or the different electronic device performing additional channel detections;
controlling a data transmission with the electronic device on the target channel taking mini-slot as a scheduling unit; and
indicating a setting of the mini-slot by downlink control information of a physical downlink control channel,
wherein when the downlink control information indicates that one electronic device is scheduled, then the electronic device performs a data transmission in a predetermined number of following mini-slots, and
wherein, otherwise, the electronic device switches to a standby state until next downlink control information.

10. The electronic device according to claim 9, the processing circuitry is further configured to:
perform control to receive an instruction of performing the channel detection from the base station; and perform control to report a result of the channel detection to the base station.

11. The electronic device according to claim 9, the processing circuitry is further configured to:
   determine a beam configuration for a communication based on specific beam direction between the user equipment and the base station.

12. The electronic device according to claim 9, the processing circuitry is further configured to perform control to report information on a real-time position of the user equipment to the base station.

13. The electronic device according to claim 9, the channel detection comprises a clear channel assessment based on specific beam direction or a received signal strength indicator based on specific beam direction.

14. A wireless communication apparatus for user equipment side, comprising:
   a transceiver device; and
   a processing circuitry configured to:
   control the transceiver device to perform a channel detection based on specific beam direction with respect to a target channel on a beam corresponding to a base station;
   control the transceiver device to access the target channel based on a result of the channel detection or based on an instruction from the base station;
   when the wireless communication apparatus exits a range of the beam and a different wireless communication apparatus enters a range of the beam during a maximum channel occupation time determined with respect to the beam, perform control for the base station to communicate with the different wireless communication apparatus using the target channel without either the base station or the different wireless communication apparatus performing additional channel detection;
   controlling a data transmission with the wireless communication apparatus on the target channel taking mini-slot as a scheduling unit; and
   indicating a setting of the mini-slot by downlink control information of a physical downlink control channel,
   wherein when the downlink control information indicates that one wireless communication apparatus is scheduled, then the wireless communication apparatus performs a data transmission in a predetermined number of following mini-slots, and
   wherein, otherwise, the wireless communication apparatus switches to a standby state until next downlink control information.

\* \* \* \* \*